United States Patent [19]
Daccord et al.

[11] Patent Number: 4,507,213
[45] Date of Patent: Mar. 26, 1985

[54] METHOD FOR OBTAINING GELLED HYDROCARBON COMPOSITIONS, THE COMPOSITIONS ACCORDING TO SAID METHOD AND THEIR APPLICATION IN THE HYDRAULIC FRACTURING OF UNDERGROUND FORMATIONS

[75] Inventors: Gerard Daccord, Saint Etienne; Richard Lemanczyk, St. Heand; Claude Vercaemer, Sorbiers, all of France

[73] Assignee: Etudes et Fabrication Dowell Schlumberger, France

[21] Appl. No.: 452,709

[22] Filed: Dec. 23, 1982

[30] Foreign Application Priority Data

Dec. 29, 1981 [FR] France ............................ 81 24653

[51] Int. Cl.$^3$ .............................................. E21B 43/26
[52] U.S. Cl. ............................ 252/8.55 R; 252/315.1
[58] Field of Search ........... 252/8.55 R, 8.5 M, 315.1; 44/7.5

[56] References Cited

U.S. PATENT DOCUMENTS

| | | | |
|---|---|---|---|
| 3,757,864 | 9/1973 | Crawford et al. | 166/308 |
| 3,990,978 | 11/1976 | Hill | 252/8.55 |
| 4,038,207 | 7/1977 | Poklacki et al. | 252/8.55 X |
| 4,104,173 | 8/1978 | Gay et al. | 252/8.55 |
| 4,174,283 | 11/1979 | Griffin | 252/8.55 |
| 4,200,539 | 4/1980 | Burnham et al. | 252/8.55 |

*Primary Examiner*—Herbert B. Guynn
*Attorney, Agent, or Firm*—Ostrolenk, Faber, Gerb & Soffen

[57] ABSTRACT

The invention relates to a method for obtaining gelled hydrocarbon compositions, and their application in the hydraulic fracturing of rocks.

The gelling method according to the invention uses as an activator a partially neutralized aluminum acid salt.

29 Claims, No Drawings

METHOD FOR OBTAINING GELLED HYDROCARBON COMPOSITIONS, THE COMPOSITIONS ACCORDING TO SAID METHOD AND THEIR APPLICATION IN THE HYDRAULIC FRACTURING OF UNDERGROUND FORMATIONS

The present invention relates to a method for obtaining gelled hydrocarbon compositions, and to the resulting gelled hydrocarbon compositions and their use in hydraulic fracturing operations conducted on underground formations.

It is known that the hydraulic fracturing consists in injecting into an underground formation, a more or less viscous liquid, so as to reach sufficient hydraulic pressure to initiate, enlarge and extend a fissure in said formation.

Compositions containing gelled hydrocarbons are often used to achieve this effect in particular when in the presence of water-sensitive layers untreatable with aqueous-based fluids.

The fracturing liquid should show a high viscosity in order to improve the rock-fracturing process, together with a low pressure drop during friction due to the movement of the fluid inside the drilling well, as well as in the fracturing process.

The chemistry of this gelation is complex and not well known. Mc.Kenzie (SPE 9007, May 1980) recently proposed a simplified explanation of this phenomenon.

The gel is generally obtained by introducing orthophosphate acid esters into hydrocarbons dispersions, and then adding a basic aluminium compound, and optionally, an inorganic base. A tridimensional polymer element then forms in the hydrocarbons, which is essentially of an aqueous type but to which the presence of long organic side chains imparts solubility in the hydrocarbons.

The gelling of hydrocarbons and its application to hydraulic fracturing have already been described in a number of patents and publications amongst which can be cited for example, U.S. Pat. Nos. 3,757,864 of Crawford et al., 4,104,173 of Gay et al., and 4,200,539 of Burnham et al., as well as British Pat. No. 1,534,554 of Borg Warner. The gelling process such as it is described in the prior art can be outlined as follows.

The tridimensional polymer element causing the gelling is constituted by a chain of orthophosphoric esters bonded with aluminum atoms. Said polymer element is prepared in situ by dispersing a mixture of orthophosphate alkyl esters, mixture A (commonly referred to as "gelling agent") in hydrocarbons (kerosene, gas-oil or crude oil), and by adding a basic aluminum compound B (such as aluminum isopropoxide, sodium aluminate, hydrated alumina) and optionally an inorganic base C.

It is frequent to have simultaneous addition of B+C (the mixture being commonly designated as "activator"), and the gel forms, after either a short time or longer, inside the hydrocarbons.

The mixture A of orthophosphate alkyl esters is conventionally prepared by reacting phosphorous hemipentoxide with a mixture of long chain alcohols, according to the reaction:

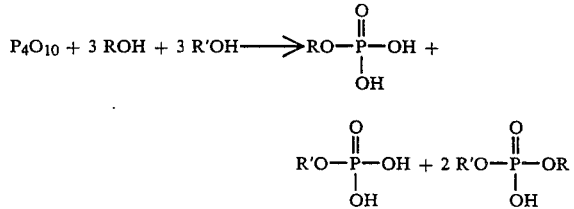

The aforementioned patents specify amongst other things the nature of the radicals R and R' which determine the final properties of the gel.

It is important to note that the orthophosphate alkyl esters (mono or diesters), when they are dispersed in hydrocarbons, have no gelling action.

Said orthophosphate esters A are acidic. The addition of less than the stoichiometric quantity (1 aluminium equivalent for every two phosphate equivalents) of a basic aluminum salt B results in partial neutralization of the esters and in formation of what is described as "partial aluminum salts" of general formula:

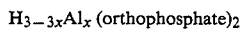

$0.25 < x < 0.75$

Said partial aluminum salts, being still acid, also do not gel the hydrocarbons (see for example U.S. Pat. No. 4,104,173, column 2, line 65 to column 3, line 1). Gelling will only occur when the inorganic base C is added, said base converting the aforesaid partial salts into what is termed as pseudo double salts (analogous to alums) of the orthophosphoric acid esters:

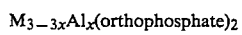

These in turn react together to form the long polymer chains which disperse into the hydrocarbons and gel them after either a short time or longer.

Therefore, up to now, it was always necessary, in order to obtain a gelled hydrocarbon composition for use in hydraulic fracturing:

to operate in two stages,
to work in a basic medium.

The inventors have discovered from the research they have conducted that it is possible to obtain this gelling in only one stage optionally using a partly neutralized aluminum acid salt as activator and that the viscosities obtained are at least as good and often better than those obtained when using a basic aluminum salt as activator.

It is therefore the object of the invention to propose a method permitting one to obtain gelled hydrocarbon compositions, using as gelling agents, solutions of orthophosphoric acid ester activated by aluminum salts, the novelty residing in that an aqueous solution of a partly neutralized aluminum acid salt is used as activator of the dispersion of the mixtures of phosphoric esters said aluminum salt having the general formula:

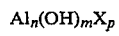

X being a mineral or organic anion or a mixture of both, for example: halide, hydrogenosulphate, sulphate, dihydrogenosulphate, acetate or like anions, (pxq)+m=3n, q being the valence of the anion and the ratio (m/3n)×100, which defines the basicity of said salt, being between 30 and 80 and preferably between 40 and 65, the pH of said aqueous solution being more than 1.5 and preferably between 2.2 and 4.

The activator which is used to obtain the gelled compositions according to the invention can be prepared from commercialized products such as aluminum chloride, aluminum polychloride, aluminum oxichloride by partial neutralization using an adapted basic product which could be for example and nonrestrively: a hydroxide, a carbonate, a phosphate or an acetate of an alkali metal or of ammonium. Said partial neutralization can be conducted before mixing the activator with the dispersion of the phosphoric esters mixture.

According to another embodiment of the invention, the partial neutralization can be conducted a short time before mixing the phosphoric esters with the starting aluminium salt. In this case, the activator can also have been partly neutralized already.

The activator concentration in the gelling composition is of course dependent on the aluminum content. It has nonetheless been established that the final ratio between the phosphoric esters concentration and the aluminum concentration (mol/liter) is advantageously between 0.2 and 1.2 and preferably between 0.3 and 1.0.

The orthophosphoric acid esters which are the most suitable to obtain the gelled hydrocarbon compositions according to the invention, are preferably selected from othophosphoric acid alkyl esters with predominance of monoalkyl or dialkyl esters.

Said orthophosphoric acid alkyl esters are prepared by any known method. Examples of said methods are given in U.S. Pat. Nos. 3,757,864 and 3,990,978.

Their optimum concentration in the gelled hydrocarbon compositions according to the invention is such that the final concentration of the mixture of orthophosphate mono- or dialkyl esters is between 0.005 and 0.2 mol/l and preferably between 0.015 and 0.1 mol/l.

The invention also relates to the gelled compositions obtained with the method described hereinabove, and to their applications to the hydraulic fracturing of underground formations.

It is also known that, in the final step of the hydraulic fracturing, it is necessary to reduce the viscosity of the gelled hydrocarbon composition by at least 50% and even but as much as 99%, in order to allow the subsequent operations of production.

It is therefore necessary to add to the gelled compositions, compounds which after a certain time, act as gel viscosity-reducing agents.

The invention therefore relates also to products for reducing the viscosity of the gelled hydrocarbon compositions described hereinabove, which products are selected from optionally substituted aromatic carboxylic acids such as in particular, benzoic acid, salicylic acid, 2-nitrobenzoic acid, or 4-nitrobenzoic acid; these products being used at a concentration between 0.02 g/l and 4 g/l of gelled composition and preferably between 0.05 g/l and 2 g/l.

The hydrocarbons gellable by the compositions according to the invention are kerosene, gasoil, and certain types of crude oil.

The invention will be more readily understood from the following description which first of all compares the viscosities of the gelled hydrocarbon compositions according to the invention with those of a control composition according to the prior art, namely of a composition whose activator is a basic aluminum salt.

In the following examples, the different ingredients of the compositions are mixed in a highspeed blender such as a "Waring Blender", at a speed of 5000 RPM and for a total period of 2 mins. 500 ml of hydrocarbon are poured into the Waring Blender cup and the apparatus is set to give 5000 RPM.

The required quantities of gelling agent and activator are added simultaneously. If a stabilizing agent or a partial neutralizing agent is required, this is added between 5 secs and 1 minute after the addition of the two main ingredients.

The viscosity of the compositions is evaluated with a Brookfield viscometer, $LV_3T$ system at 3 RPM. An $LV_4T$ system is used when viscosities higher than 400 P are obtained.

The gelling agent used both in the control composition prepared with a conventional activator, and in the compositions according to the invention and described in Examples 1 to 10 are of the type described in U.S. Pat. No. 3,990,978, namely a reaction product of 53.9% by weight of a mixture of octyl and decyl alcohols, 28.9% by weight of phosphorous pentoxide, 17.2% by weight of anhydrous ethanol, 16.7% by weight of toluene and 3% by weight of tall-oil; this agent is mixed in the proportion of 4 ml in 500 ml of kerosene and with the different activators described in the following examples.

CONTROL 0.5 ml of a solution at 38% by weight of sodium aluminate having a pH greater than 13, is used as activator.

EXAMPLE 1

4 ml of a 0.75M aluminum chloride solution (pH 3.1) are used as activator, and partially neutralized with 1.3 ml of an 8M sodium hydroxide solution after 30 secs pre-mixing.

EXAMPLE 2

The same activator is used as in Example 1, but the partial neutralization is carried out with 7 ml of a 2M sodium carbonate solution.

EXAMPLE 3

A 2.1M industrial aluminum chloride solution (pH below 1) is used as activator, after partial neutralization of 4 ml of said solution with 1.2 ml of an 8M sodium hydroxide solution.

EXAMPLE 4

A 0.75 aluminum sulphate solution (pH 2.8) is used as activator. 4 ml of said solution are partially neutralized after pre-mixing with 7 ml of a 2M sodium carbonate solution.

EXAMPLE 5

4 ml of a 50/50 mixture of the activator solutions of Examples 1 and 4 (pH 2.9) are used as activator, and partially neutralized with 7 ml of a 2M sodium carbonate solution after pre-mixing.

EXAMPLE 6

4 ml of a 2.15M industrial aluminum polychloride solution (pH 2.4) are used as activator.

EXAMPLE 7

The activator used is the same as in Example 6, but after 30 secs pre-mixing, 1 ml of a 4M sodium hydroxide solution is added thereto to complete the partial neutralization.

EXAMPLE 8

0.4 g of commercial sodium acetate trihydrate are dissolved in 4 ml of an industrial aluminum polychloride solution (pH 2.8) and this solution is used as activator.

EXAMPLE 9

0.8 g of commercial sodium acetate trihydrate are dissolved in 4 ml of an industrial aluminum polychloride solution (pH 3.2) and this solution is used as activator.

EXAMPLE 10

1 ml of a 5.7M aluminum oxychloride solution (pH 2.7) is used as activator.

In Examples 11 to 13, different concentrations of gelling agent and activator are used. The hydrocarbon is kerosene (500 ml); the gelling agent is the same as that used in Examples 1 to 10 and the activator is a solution of 140 g of sodium acetate trihydrate in one liter of a commercial aluminium polychloride solution (pH 2.4).

EXAMPLE 11

3 ml of gelling agent and 3 ml of activator are used.

EXAMPLE 12

4 ml of gelling agent and 4 ml of activator are used.

EXAMPLE 13

5 ml of gelling agent and 5 ml of activator are used.

In Examples 14 and 15, the nature of the hydrocarbon varies, the gelling agent and the activator being the same as those of Examples 11 to 13.

EXAMPLE 14

500 ml of diesel oil are gelled with 4 ml of gelling agent and 4 ml of activator.

EXAMPLE 15

500 ml of a crude oil from Gialo field, Lybia-(API density 37°5 at 20° C., viscosity: 94 cps) are gelled with 10 ml of gelling agent and 10 ml of activator.

In Examples 16 and 17, the gelling agent is an orthophosphate dialkyl ester, such as described in U.S. Pat. No. 3,757,864 and the activator is the same as that used in Examples 11 to 15.

EXAMPLE 16

4 ml of gelling agent are used with 4 ml of activator.

EXAMPLE 17

5 ml of gelling agent are used with 5 ml of activator.

In Examples 18 to 20, the variations of viscosity of the gel obtained in Example 12 are recorded by placing said gel 10 mins. after the beginning of the mixing, in a water bath kept at the required temperature.

EXAMPLE 18

The test temperature is 40° C.

EXAMPLE 19

The test temperature is 60° C.

EXAMPLE 20

The test temperature is 80° C.

Table I hereafter gives the values of the viscosity of the control composition and of the compositions described in Examples 1 to 20.

TABLE I

VISCOSITY OF THE DIFFERENT COMPOSITIONS

| Example No. | Viscosity after 3 mins. (in poises) | Time needed to reach 400 poises | Viscosity after 1 hr. (in poises) |
| --- | --- | --- | --- |
| Control | 2 | — | 52 |
| 1 | 26 | — | 40 |
| 2 | 12 | — | 40 |
| 3 | 200 | 15 mins. | >400 |
| 4 | 100 | — | 250 |
| 5 | 100 | — | 100 |
| 6 | 50 | 40 mins. | >400 |
| 7 | 100 | 30 mins. | >400 |
| 8 | >400 | <3 mins. | >400 |
| 9 | >400 | <3 mins. | >400 |
| 10 | 20 | 12 mins. | >400 |
| 11 | 200 | 10 mins. | >400 |
| 12 | >400 | <3 mins. | >400 |
| 13 | >400 | <3 mins. | >400 |
| 14 | 200 | 30 mins. | >400 |
| 15 | 300 | 10 mins. | >400 |
| 16 | 3 | — | 50 |
| 17 | 4 | — | 80 |
| 18 | >400 | <3 mins. | >400 |
| 19 | >400 | <3 mins. | >400 |
| 20 | >400 | <3 mins. | >400 |

It is clear from this Table that the compositions according to the invention are all found to have a satisfactory viscosity, which is quite comparable to the viscosities of the compositions in which the activator is a really basic aluminum salt.

An improvement of the gelling speed is also noted in some cases.

Examples 21 to 28 test the efficiency of the compositions according to the invention of different viscosity breaking products used at different concentrations and at different temperatures. The testing process consists in gelling 500 ml of kerosene as indicated in Example 12, the indicated quantity of breaking agent being added after 30 secs. of mixing. The results are given in Table 2 hereafter.

EXAMPLE 21

0.5 g of benzoic acid are used as breaking agent, the temperature being kept at 50° C.

EXAMPLE 22

0.075 g of salicylic acid in suspension in 1 ml of a 2M sodium carbonate solution are used as breaking agent, the temperature being kept at 50° C.

EXAMPLE 23

1 g of 2-nitrobenzoic acid is used as breaking agent, the temperature being kept at 40° C.

EXAMPLE 24

0.6 g of 2-nitrobenzoic acid are used as breaking agent, the temperature being kept at 50° C.

EXAMPLE 25

0.12 g of 2-nitrobenzoic acid are used as breaking agent, the temperature being kept at 65° C.

EXAMPLE 26

0.08 g of 2-nitrobenzoic acid are used as breaking agent, the temperature being kept at 80° C.

EXAMPLE 27

0.5 g of 4-nitrobenzoic acid are used as breaking agent, the temperature being kept at 50° C.

EXAMPLE 28

0.75 g of 4-nitrobenzoic acid are used as breaking agent, the temperature being kept at 50° C.

TABLE 2

| Example N° | Breaking time (in hours) | Amount of residual viscosity (in % of initial viscosity) |
|---|---|---|
| 21 | 6 | <5 |
| 22 | 10 | <8 |
| 23 | 7 | <3 |
| 24 | 3 | <1 |
| 25 | 5 | <1 |
| 26 | 4 | <2 |
| 27 | 4 | <2 |
| 28 | 3 | <2 |

The gel breaking time is defined as the time required for the viscosity of that gel to be 10% less than the maximum viscosity.

Table 2 clearly shows the advantage of the nitrated derivatives, particularly in ortho- or para-position, of benzoic acid, described for the first time in this application.

The invention is in no way limited to the examples given hereinabove and on the contrary covers all variants regardless of the nature of the gelling agent and hydrocarbon used.

What is claimed is:

1. In the method of obtaining a gelled hydrocarbon composition by mixing a solution of alkyl orthophosphate esters activated by aluminum with the hydrocarbon, the improvement which comprises employing as the aluminum, an aqueous solution of a partially neutralized aluminum acid salt of the formula:

$$Al_n(OH)_m X_p$$

wherein X is halide, hydrogenosulfate, sulfate, dihydrogenophosphate or acetate, (pxq)+m=3n where q is the valence of the anion, the ratio of 100m/3n being between 30 and 80, the aqueous solution having a pH of more than 1.5 to a pH of 4.

2. The method of claim 1 wherein the ratio 100m/3n is between 40 and 65.

3. The method of claim 1 wherein the pH of the aqueous solution is between 2.2 and 4.

4. The method of claim 1 wherein said partially neutralized aluminum acid salt is formed before mixing of the alkyl orthophosphate esters activated by aluminum with the hydrocarbon.

5. The method of claim 1 wherein the partially neutralized aluminum acid salt is formed by partial neutralization a short time after mixing the aluminum acid salt with the alkyl orthophosphate esters and hydrocarbon.

6. The method of claims 1 wherein the ratio between the orthophosphoric esters and aluminum concentration in moles per liter is between 0.2 and 1.2.

7. The method of claim 6 wherein the ratio is between 0.3 and 1.

8. The method of claim 1 in which the alkyl orthophosphate esters are mono and dialkyl esters in a concentration of 0.005 and 0.2 mole per liter of gelled composition.

9. The method of claim 8 wherein the concentration is between 0.015 and 0.1 mole per liter.

10. The method of claim 1 wherein an aromatic carboxylic acid breaking agent is added to the gelled composition.

11. The method of claim 10 wherein the breaking agent is a nitrobenzoic acid.

12. The method of claim 11 wherein the breaking agent is 2-nitrobenzoic acid.

13. The method of claim 11 wherein the breaking agent is 4-nitrobenzoic acid.

14. The method of claim 10 wherein the breaking agent is added at a concentration between 0.02 and 4 grams per liter of gelled composition.

15. The method of claim 14 wherein the breaking agent concentration is between 0.05 and 2 grams per liter.

16. In a gelled hydrocarbon composition comprising hydrocarbon, alkyl orthophosphate esters and aluminum component, the improvement which comprises the aluminum component being an aqueous solution of a partially neutralized aluminum acid salt of the formula:

$$Al_n(OH)_m X_p$$

wherein X is halide, hydrogenosulfate, sulfate, dihydrogenophosphate or acetate, (pxq)+m=3n where q is the valence of the anion, the ratio of 100m/3n being between 30 and 80, and the aqueous solution having a pH of more than 1.5 to a pH of 4.

17. The composition of claim 16 wherein the ratio 100m/3n is between 40 and 65.

18. The gelled composition of claim 16 wherein the pH of the aqueous solution is between 2.2 and 4.

19. The gelled composition of claim 16 wherein the ratio between the orthophosphoric esters and aluminum concentration in moles per liter is between 0.2 and 1.2.

20. The gelled composition of claim 19 wherein the ratio is between 0.3 and 1.

21. The gelled composition of claim 16 wherein the alkyl orthophosphate esters are mono and dialkyl esters in a concentration between 0.005 and 0.2 moles per liter of gelled composition.

22. The gelled composition of claim 21 wherein the concentration of esters is between 0.015 and 0.1 mole per liter.

23. The gelled composition of claim 16 containing an aromatic carboxylic acid breaking agent.

24. The gelled composition of claim 23 wherein the breaking agent is nitrobenzoic acid.

25. The gelled composition of claim 24 wherein the breaking agent is 2-nitrobenzoic acid or 4-nitrobenzoic acid.

26. The gelled composition of claim 24 wherein the breaking agent concentration is between 0.02 and 4 grams per liter of gelled composition.

27. The gelled composition of claim 26 wherein the breaking agent concentration is between 0.05 and 2 grams per liter.

28. In the method of applying a gelled hydrocarbon composition to an underground formation for hydraulic fracturing, the improvement which comprises injecting into the formation under pressure the gelled hydrocarbon composition of claim 16.

29. In a method of applying a gelled hydrocarbon composition to an underground formation for hydraulic fracturing, the improvement which comprises sufficient to fracture said formation the gelled hydrocarbon composition of claim 23.

* * * * *